Jan. 20, 1925.  J. WALKER  1,523,923
CUSHION WHEEL
Filed March 22, 1924
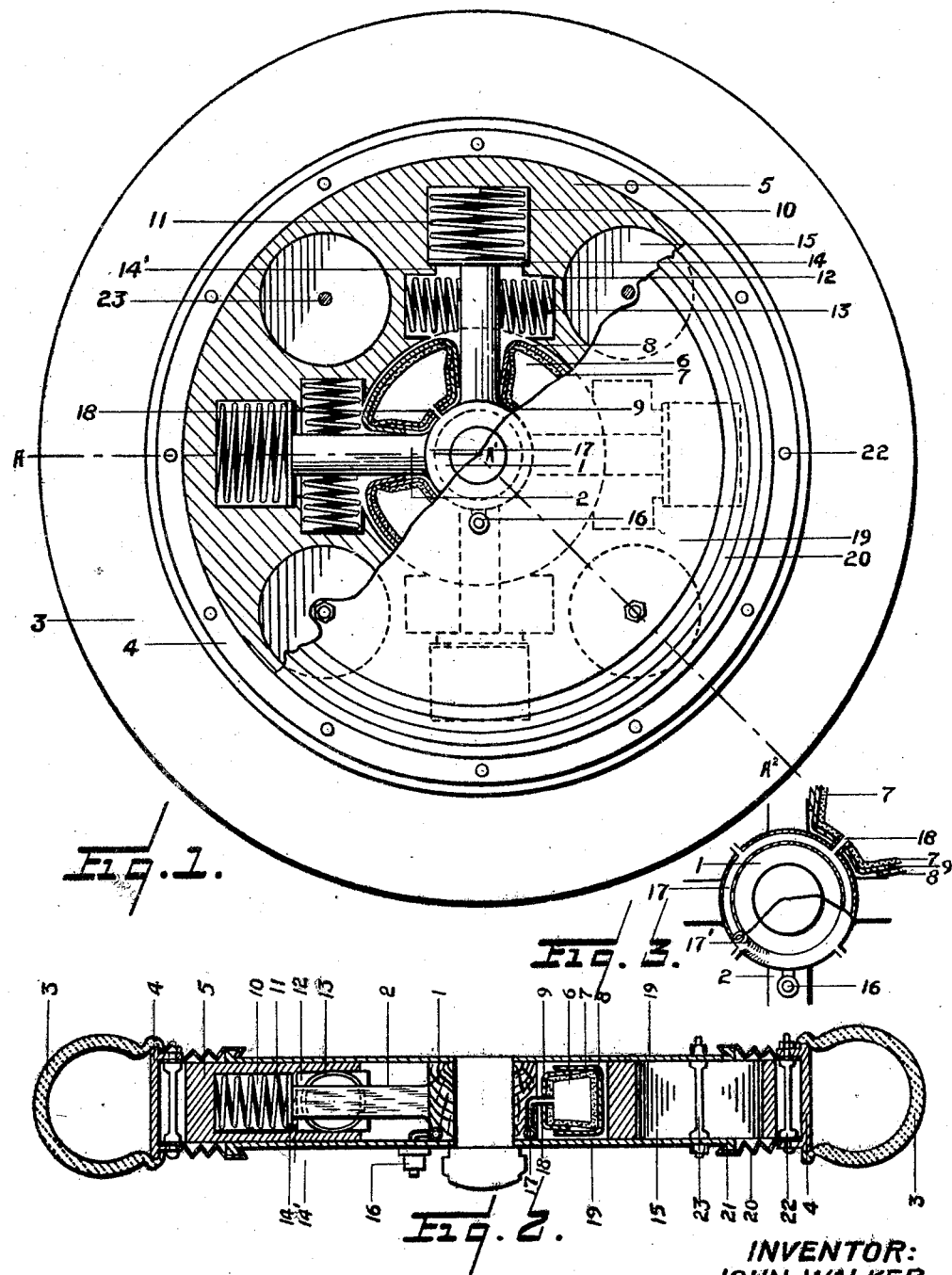
INVENTOR:
JOHN WALKER
By Featherstonhaugh & Co.
ATTY'S Patented Jan. 20, 1925.

1,523,923

UNITED STATES PATENT OFFICE.

JOHN WALKER, OF BARRIE, ONTARIO, CANADA.

CUSHION WHEEL.

Application filed March 22, 1924. Serial No. 701,074.

*To all whom it may concern:*

Be it known that I, JOHN WALKER, a subject of the King of Great Britain, and a resident of the town of Barrie, in the county of Simcoe, in the Province of Ontario, Canada, have invented certain new and useful Improvements in Cushion Wheels, of which the following is the specification.

My invention relates to improvements in cushion wheels, and the object of the invention is to devise a resilient automobile wheel of such construction as will be particularly adapted for use on heavy trucks. A further object is to provide such a construction as will allow necessary repairs and renewals to be made conveniently and rapidly.

My invention consists of a wheel provided with a suitable tire and rim, a cushion device located within the rim comprising a floating felloe on pneumatic cushions supported by the felloe and an arrangement of springs located at the end of the spokes, face cover plates and rings of flexible material enclosing the cushioning device, the parts being otherwise arranged and constructed in detail as hereinafter more particularly explained.

Fig. 1 represents a face view of my wheel with part of the outer cover plate removed and the felloe and pneumatic cushions in section.

Fig. 2 is a cross section through the wheel along the line A—A'—A², Fig. 1.

Fig. 3 is an enlarged detail of the air valve and channels leading to the pneumatic cushions.

In the drawings like characters of reference indicate corresponding parts in the different views.

1 is the hub of a motor vehicle wheel, from which radiate the spokes 2. 3 is the tire and 4 the rim. 5 is a floating felloe. 6 are pneumatic cushions located between the spokes 2 and supported by the felloe. Each pneumatic cushion consists of a rubber bag 7 encased by an outer spring-steel covering 8, and an inner spring steel covering 9, the outer covering 8 being slidably fitted on the inner covering 9. The floating felloe 5 is provided with housings 10 for the terminal coil springs 11 located at the outer end of the spokes 2, and further housings 12 for the pairs of coil springs 13 located laterally of the spokes 2. The terminal coil spring 11 is supported on a base plate 14 supported by shoulders 14', against which base plate 14 the spoke 2 slides in the line of motion of the wheel. This sliding motion of the spokes 2 compresses the lateral springs in the direction of rotation. Relatively large recesses 15 are cut in that portion of the felloe 5 located between the spokes.

Air is admitted to the pneumatic cushions 6 by a valve 16, to which a pump or air line may be fitted. The air is then conducted to the cushions by a tube 17 fitting in an annular groove 17' cut in the outer periphery of the hub 1. Smaller tubes 18 radiating from the annular air channel 17 admit the air to the pneumatic cushions 6. Encasing the cushioning devices above described is a pair of face cover plates 19, terminating centrally at the hub 1, and peripherally at rings 20 of flexible material. The rings 20 are attached to the cover plates 19 by a circumferential hooked lip extending over a circumferential flange 21 forming part of the cover plates, and are secured to the rim 4 by stay bolts 22. The rings 20 are sufficiently light so that the corrugations will expand and contract as the wheel rotates, and thereby permit the free movement of the hub and parts connected thereto. Further stay bolts 23 passing through the holes 15 in the felloe 5 serve to secure the cover plates 19 in place, and at the same time permit the freedom of movement of the floating felloe.

In my cushion wheel the action of the floating felloe 5 is against the central pneumatic chambers 6 and the action of the spokes 2 is against the terminal springs 11 and against the lateral springs 13. The combination action produces such a cushioning effect as will enable, where desirable, the use of solid instead of pneumatic tires, particularly in heavy trucks where pneumatic tires are so frequently objectionable.

From the above description it will be evident that I have devised an effective improvement in wheel cushioning devices that will be applicable to any weight of vehicle, and that my construction is of such a type as will enable necessary repairs or renewals to be conveniently made.

What I claim as my invention is:

1. A resilient wheel comprising a tire, a rim, a hub and spokes, a floating felloe within the rim having housings for the spokes, pneumatic cushions supported by the felloe, and means for enclosing and holding the aforesaid parts in position.

2. A resilient wheel comprising a tire, a rim, a hub and spokes, a floating felloe within the rim having housings for the spokes, pneumatic cushions supported by the felloe, face cover plates encasing the cushions, felloe and spokes, and a flexible enclosing means between the cover plates and rim.

3. A resilient wheel comprising a tire, a rim, a hub and spokes, a floating felloe within the rim having housings for the spokes, pneumatic cushions supported by the felloe, face cover plates encasing the cushions, felloe and spokes, and rings of flexible material secured between the circumference of the cover plates and the rim of the wheel.

4. A resilient wheel comprising a tire, a rim, a hub and spokes, a floating felloe containing housings for springs positioned terminally of the spokes, springs fitted within the said housings, face cover plates encasing the felloe, springs and spokes, and a flexible enclosing means between the cover plates and rim.

5. A resilient wheel comprising a tire, a rim, a hub and spokes, a floating felloe containing housings for springs positioned terminally of the spokes, springs fitted within the said housings, face cover plates encasing the felloe, springs and spokes, and rings of flexible material secured between the circumference of the cover plates and the rim of the wheel.

6. A resilient wheel comprising a tire, a rim, a hub and spokes, a floating felloe containing housing for springs positioned laterally of the spokes, springs fitted in said housings, face cover plates encasing the felloe, springs and spokes, and a flexible enclosing means between the cover plates and rim.

7. A resilient wheel comprising a tire, a rim, a hub and spokes, a floating felloe containing housings for springs positioned laterally of the spokes, springs fitted in said housings, face cover plates encasing the felloe, springs and spokes, and rings of flexible material secured between the circumference of the cover plates and the rim of the wheel.

8. The combination with a tire and a rim, of a hub having spokes, a floating felloe containing housings for springs positioned terminally and laterally of the spokes, springs fitted within the said housings, face cover plates encasing the felloe, springs and spokes, and a flexible enclosing means between the cover plates and rim.

9. The combination with a tire and a rim, of a hub having spokes, a floating felloe containing housings for springs positioned terminally and laterally of the spokes, springs fitted within the said housings, face cover plates encasing the felloe, springs and spokes, and rings of flexible material secured between the circumference of the cover plates and the rim of the wheel.

10. The combination with a tire and a rim, of a hub having spokes, a floating felloe containing housings for springs positioned terminally and laterally of the spokes, springs fitted within the said housings, pneumatic cushions supported by the felloe, face cover plates encasing the felloe, springs, spokes and cushions, and a flexible enclosing means between the cover plates and rim.

11. The combination with a tire and a rim, of a hub having spokes, a floating felloe containing housings for springs positioned terminally and laterally of the spokes, springs fitted within the said housings, pneumatic cushions supported by the felloe, face cover plates encasing the felloe, springs, spokes and cushions, and rings of flexible material secured between the circumference of the cover plates and the rim of the wheel.

12. The combination with a tire and a rim of a hub having spokes, a floating felloe having recesses cut from those portions situated between the spokes, and containing housings for springs positioned terminally and laterally of the spokes, springs fitted within the said housings, pneumatic cushions supported by the felloe, face cover plates encasing the springs, spokes and cushion device, stay bolts passing through the aforementioned recesses and secured in the cover plates, and a flexible enclosing means between the cover plates and the rim.

13. The combination with a tire and a rim of a hub having spokes, a floating felloe having recesses cut from those portions situated between the spokes and containing housings for springs positioned terminally and laterally of the spokes, springs fitted within the said housings, pneumatic cushions supported by the felloe, face cover plates encasing the springs, spokes and cushion device, stay bolts passing through the aforementioned recesses and secured in the cover plates, and rings of flexible material secured between the circumference of the cover plates and the rim of the wheel.

14. The combination with a tire and a rim, of a hub having spokes, a floating felloe containing housings for springs positioned terminally and laterally of the spokes, springs fitted within said housings, base plates contacting with the terminally positioned springs against the faces of which the ends of the spokes having sliding contact, pneumatic cushions located between the spokes and supported by the felloe, face cover plates encasing the springs, spokes and cushion device, and a flexible enclosing means between the cover plates and the rim.

15. The combination with a tire and a rim, of a hub having spokes, a floating felloe containing housings for springs positioned terminally and laterally of the spokes, springs fitted within said housings, base plates contacting with the terminally positioned springs against the faces of which the ends of the spokes having sliding contact, pneumatic cushions located between the spokes and supported by the felloe, face cover plates encasing the springs, spokes and cushion device, and rings of flexible material secured between the circumference of the cover plates and the rim of the wheel.

16. The combination with a tire and a rim, of a hub having spokes, a floating felloe having recesses cut from those portions situated between the spokes and containing housings for springs positioned terminally and laterally of the spokes, springs fitted within said housings, base plates contacting with the terminally positioned springs against the faces of which the ends of the spokes having sliding contact, pneumatic cushions supported by the felloe, face cover plates encasing the springs, spokes and cushion device, stay bolts passing through the aforementioned recesses and secured in the cover plates, and a flexible enclosing means between the cover plates and the rim.

17. The combination with a tire and a rim, of a hub having spokes, a floating felloe having recesses cut from those portions situated between the spokes and containing housings for springs positioned terminally and laterally of the spokes, springs fitted within said housings, base plates contacting with the terminally positioned springs against the faces of which the ends of the spokes having sliding contact, pneumatic cushions supported by the felloe, face cover plates encasing the springs, spokes and cushion device, stay bolts passing through the aforementioned recesses and secured in the cover plates, and rings of flexible material secured between the circumference of the cover plates and the rim of the wheel.

18. The combination with a tire, a rim, a hub and spokes, suitable cushioning devices and detachable face cover plates, of rings of corrugated spring steel secured to the rim by suitable bolts and to circumferential flanges forming part of the cover plates by grasping flanges forming part of the spring steel rings.

JOHN WALKER.